United States Patent
Liu et al.

(10) Patent No.: US 12,047,149 B2
(45) Date of Patent: Jul. 23, 2024

(54) METHOD AND NETWORK DEVICE FOR RANK SELECTION

(71) Applicant: Telefonaktiebolaget LM Ericsson (publ), Stockholm (SE)

(72) Inventors: Chunhui Liu, Beijing (CN); Erik Eriksson, Linköping (SE); John Skördeman, Linköping (SE); Liping Han, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 355 days.

(21) Appl. No.: 17/607,594

(22) PCT Filed: May 10, 2019

(86) PCT No.: PCT/CN2019/086418
§ 371 (c)(1),
(2) Date: Oct. 29, 2021

(87) PCT Pub. No.: WO2020/227853
PCT Pub. Date: Nov. 19, 2020

(65) Prior Publication Data
US 2022/0209833 A1    Jun. 30, 2022

(51) Int. Cl.
*H04B 7/06* (2006.01)
*H04L 1/00* (2006.01)
(Continued)

(52) U.S. Cl.
CPC ........... *H04B 7/063* (2013.01); *H04B 7/0632* (2013.01); *H04L 1/0003* (2013.01); *H04L 1/0009* (2013.01); *H04W 72/563* (2023.01)

(58) Field of Classification Search
CPC ..... H04L 47/10; H04L 43/50; H04L 12/2697; H04L 43/0852; H04L 43/00;
(Continued)

(56) References Cited

U.S. PATENT DOCUMENTS 8,112,049 B2    2/2012  Tidestav
8,437,268 B2 *  5/2013  Cai ....................... H04L 1/0026
                                                          370/278
(Continued)

FOREIGN PATENT DOCUMENTS

CN    102640431 A  *  8/2012  ........... H04B 7/0632
CN    102792726 A  *  11/2012  ......... H04W 72/563
(Continued)

OTHER PUBLICATIONS

TSG-RAN WG1 358, Miyazaki, Japan, Oct. 12-16, 2009, R1-093806, Source: ZTE, Title: Feedback for Dual Layer Beamforming in LTE-TDD, Agenda item: 6.4.2. (Year: 2009).*
(Continued)

*Primary Examiner* — Peter G Solinsky
*Assistant Examiner* — Sanjay K Dewan
(74) *Attorney, Agent, or Firm* — Sage Patent Group (57) ABSTRACT

The present disclosure provides a method in a network device for rank selection. The method includes: adjusting a rank for a transmission to or from a terminal device; and selecting a rank to be used for the transmission based on whether the transmission using the adjusted rank has been successfully received.

18 Claims, 6 Drawing Sheets

(51) Int. Cl.
*H04W 72/06* (2009.01)
*H04W 72/563* (2023.01)

(58) Field of Classification Search
CPC ............... H04L 1/0003; H04L 1/0009; H04W 72/563; H04W 72/06; H04B 7/063; H04B 7/0632
USPC .......................................................... 370/252
See application file for complete search history.

(56) References Cited

U.S. PATENT DOCUMENTS

| | | | |
|---|---|---|---|
| 2005/0169391 A1* | 8/2005 | Takeda | H04L 1/0003 375/259 |
| 2010/0329134 A1* | 12/2010 | Doppler | H04L 1/0029 370/252 |
| 2012/0113844 A1* | 5/2012 | Krishnamurthy | H04W 24/02 370/252 |
| 2012/0243430 A1* | 9/2012 | Song | H04L 1/0035 370/252 |
| 2012/0287813 A1* | 11/2012 | Alm | H04L 1/0009 370/252 |
| 2012/0287883 A1* | 11/2012 | Sabella | H04L 1/0009 370/329 |
| 2012/0307648 A1 | 12/2012 | Okubo et al. | |
| 2013/0077514 A1* | 3/2013 | Dinan | H04W 24/10 370/252 |
| 2014/0064392 A1 | 3/2014 | Jonsson et al. | |
| 2015/0327277 A1* | 11/2015 | Olsson | H04L 1/203 370/252 |
| 2017/0273056 A1* | 9/2017 | Papasakellariou | H04W 52/146 |

FOREIGN PATENT DOCUMENTS

| | | | | |
|---|---|---|---|---|
| CN | 104702324 A | * | 6/2015 | ............... H04B 7/04 |
| EP | 2997688 A1 | | 3/2016 | |
| EP | 2997688 B1 | | 8/2018 | |
| WO | 2018064313 A1 | | 4/2018 | |
| WO | WO 2018/064313 A1 | * | 4/2018 | ............... H04L 5/00 |
| WO | WO 2020/167851 A1 | * | 8/2020 | ............... H04L 1/18 |

OTHER PUBLICATIONS

International Search Report and Written Opinion of the International Searching Authority for PCT International Application No. PCT/CN2019/086418 dated Feb. 12, 2020.
Zte, "Feedback for Dual Layer Beamforming LTE-TDD," R1-093806, TSG-RAN WG1 #58, Miyazaki, Japan Oct. 12-16, 2009, 7 pages.
3GPP TS 38.212 V15.1.0, "3rd Generation Partnership Project; Technical Specification Group Radio Access Network; NR; Multiplexing and channel coding (Release 15)," Mar. 2018, 94 pages.
3GPP TS 36.213 V10.0.0, "3rd Generation Partnership Project; Technical Specification Group Radio Access Network; Evolved Universal Terrestrial Radio Access (E-UTRA); Physical layer procedures (Release 10)," Dec. 2010, 98 pages.
3GPP TS 38.211 V15.1.0, "3rd Generation Partnership Project; Technical Specification Group Radio Access Network; NR; Physical channels and modulation (Release 15)," Mar. 2018, 90 pages.
Communication pursuant to Rule 164(1) EPC regarding the partial supplementary European Search Report for European Patent Application No. 19928854.9 dated Mar. 21, 2023.

* cited by examiner

METHOD AND NETWORK DEVICE FOR RANK SELECTION

CROSS REFERENCE TO RELATED APPLICATION

This application is a 35 U.S.C. § 371 national stage application of PCT International Application No. PCT/CN2019/086418 filed on May 10, 2019, the disclosure and content of which is incorporated by reference herein in its entirety.

TECHNICAL FIELD

The present disclosure relates to communication technology, and more particularly, to a method and a network device for rank selection.

BACKGROUND

The 5th Generation (5G) wireless systems feature wireless technologies including: millimeter wave (mmW) bands (e.g., at 26, 28, 38 and 60 GHz), capable of providing data rates as high as 20 gigabits per second; massive Multiple Input Multiple Output (MIMO) (e.g., with 64-256 antennas), capable of providing a throughput up to ten times higher than that of the current 4th Generation (4G) networks; and "Low-band 5G" and "Mid-band 5G", capable of using frequencies from 600 MHz to 6 GHz to significantly improve the performance, flexibility, scalability and efficiency of the current mobile networks, so as to utilize available spectrums, licensed, shared or unlicensed, across a wide variety of spectrum bands.

With the MIMO techniques employed in the 5G wireless systems, downlink transmissions can be mapped to different layers, see Section 7.3.1.3 in the $3^{rd}$ Generation Partnership Project (3GPP) Technical Specification (TS) 38.211, V 15.1.0, which is incorporated herein by reference in its entirety. Furthermore, a terminal device, or User Equipment (UE), can be equipped with multiple antennas for uplink transmission. Thus, in the 5G New Radio (NR), there are two options for uplink waveforms: Cyclic Prefix Orthogonal Frequency Division Multiplexing (CP-OFDM), which is the same as downlink waveforms, and Discrete Fourier Transform spread OFDM (DFT-s-OFDM), which is the same as Long Term Evolution (LTE) uplink waveforms. In order to create a DFT-s-OFDM waveform, transform precoding is applied to spread uplink data in a specific way to reduce Peak-to-Average Power Ratio (PAPR) of the waveform, which means one codeword can be mapped to multiple layers. A UE can be informed of the selected mapping via Downlink Control Information (DCI), see 3GPP TS 38.212, V 15.1.0, which is incorporated herein by reference in its entirety.

According to Section 6.3.1.3 in 3GPP TS 38.212, a single codeword, i.e., complex-valued modulation symbols for the codeword to be transmitted, shall be mapped onto up to four layers according to the first four rows in the table in Section 7.3.1.3 in 3GPP TS 38.212, reproduced as Table 1 below:

TABLE 1

Codeword-to-Layer Mapping for Spatial Multiplexing

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$<br>$x^{(1)}(i) = d^{(0)}(2i + 1)$ | $M_{symb}^{layer} = M_{symb}^{(0)}/2$ |
| 3 | 1 | $x^{(0)}(i) = d^{(0)}(3i)$<br>$x^{(1)}(i) = d^{(0)}(3i + 1)$<br>$x^{(2)}(i) = d^{(0)}(3i + 2)$ | $M_{symb}^{layer} = M_{symb}^{(0)}/3$ |
| 4 | 1 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$ | $M_{symb}^{layer} = M_{symb}^{(0)}/4$ |
| 5 | 2 | $x^{(0)}(i) = d^{(0)}(2i)$<br>$x^{(1)}(i) = d^{(0)}(2i + 1)$<br>$x^{(2)}(i) = d^{(1)}(3i)$<br>$x^{(3)}(i) = d^{(1)}(3i + 1)$<br>$x^{(4)}(i) = d^{(1)}(3i + 2)$ | $M_{symb}^{layer} = M_{symb}^{(0)}/2 = M_{symb}^{(1)}/3$ |
| 6 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(3i)$<br>$x^{(4)}(i) = d^{(1)}(3i + 1)$<br>$x^{(5)}(i) = d^{(1)}(3i + 2)$ | $M_{symb}^{layer} = M_{symb}^{(0)}/3 = M_{symb}^{(1)}/3$ |
| 7 | 2 | $x^{(0)}(i) = d^{(0)}(3i)$<br>$x^{(1)}(i) = d^{(0)}(3i + 1)$<br>$x^{(2)}(i) = d^{(0)}(3i + 2)$<br>$x^{(3)}(i) = d^{(1)}(4i)$<br>$x^{(4)}(i) = d^{(1)}(4i + 1)$<br>$x^{(5)}(i) = d^{(1)}(4i + 2)$<br>$x^{(6)}(i) = d^{(1)}(4i + 3)$ | $M_{symb}^{layer} = M_{symb}^{(0)}/3 = M_{symb}^{(1)}/4$ |
| 8 | 2 | $x^{(0)}(i) = d^{(0)}(4i)$<br>$x^{(1)}(i) = d^{(0)}(4i + 1)$<br>$x^{(2)}(i) = d^{(0)}(4i + 2)$<br>$x^{(3)}(i) = d^{(0)}(4i + 3)$<br>$x^{(4)}(i) = d^{(1)}(4i)$<br>$x^{(5)}(i) = d^{(1)}(4i + 1)$<br>$x^{(6)}(i) = d^{(1)}(4i + 2)$<br>$x^{(7)}(i) = d^{(1)}(4i + 3)$ | $M_{symb}^{layer} = M_{symb}^{(0)}/4 = M_{symb}^{(1)}/4$ |

The uplink rank, i.e., the number of uplink transmission layers, shall be determined by a network device (e.g., a gNB) and indicated to a UE via DCI Format 0_1 defined in Section 7.3.1.1.2 in 3GPP TS 38.212. The same table can be used for downlink as well (note that NR can support up to four layers in the uplink and up to eight layers in the downlink). For further details, reference can be made to 3GPP TS 38.212 and 3GPP TS 38.211.

Based on uplink channel measurements on e.g., Sounding Reference Signal (SRS) or Physical Uplink Shared Channel (PUSCH), the maximum number of uplink transmission layers can be estimated by a gNB. When SRS-based channel measurements are employed, SRS resources are assigned to a UE and the uplink rank estimation can be driven by SRS reception. On the other hand, when PUSCH-based channel measurements are employed, the uplink rank estimation relies on UE traffic, i.e., the uplink rank can be estimated only when the UE has uplink data to transmit. Similarly, the maximum number of downlink transmission layers can be estimated by a UE based on downlink channel measurements. Then, the UE can report the estimated downlink rank to a gNB.

It is desired to select an optimal rank (uplink or downlink) for a given channel, which can be e.g., the highest rank to satisfy a target Block Error Rate (BLER). For example, a gNB can estimate an uplink or downlink rank based on channel measurements obtained by the gNB or a UE on reference signals. However, channels are typically time varying. Field test results have suggested errors or differences between estimated ranks and optimal ones, so-called "rank override", see e.g., U.S. Pat. No. 8,112,049B2, CN102640431A and EP2997688B1. Such rank estimation error may have limited impact when the maximum number of layers is small (e.g., the LTE system only supports up to two layers in downlink and one layer in uplink). However, the 5G NR can support up to eight layers in downlink and up to four layers in uplink, and in this case the rank estimation error may cause significant performance degradation. Moreover, rank estimation may be bias, meaning that it is prone to either overestimation or underestimation. Such overestimation or underestimation could make the rank much higher or much lower than the optimal one.

SUMMARY

It is an object of the present disclosure to provide a method and a network device for rank selection, capable of selecting an optimal rank in an efficient manner.

According to a first aspect of the present disclosure, a method in a network device for rank selection is provided. The method includes: adjusting a rank for a transmission to or from a terminal device; and selecting a rank to be used for the transmission based on whether the transmission using the adjusted rank has been successfully received.

In an embodiment, the method may further include: adjusting a Modulation and Coding Scheme (MCS) for the transmission in association with the adjusting of the rank, such that a Transport Block Size (TBS) or a ratio of the TBS to a number of sub-carriers used for the transmission remains unchanged after the adjusting of the rank.

In an embodiment, the operation of adjusting may include: increasing the rank for the transmission from a first rank to a second rank, the second rank being obtained by increasing the first rank by a predetermined step or selected from a set of rank candidates.

In an embodiment, the operation of selecting the rank to be used for the transmission may include: selecting the second rank as the rank to be used for the transmission when the transmission using the second rank has been successfully received, or selecting the first rank as the rank to be used for the transmission when the transmission using the second rank has not been successfully received.

In an embodiment, the method may further include, subsequent to selecting the second rank as the rank to be used for the transmission: further increasing the rank for the transmission, until the transmission using a third rank has not been successfully received; and selecting a rank used immediately before the third rank as the rank to be used for the transmission.

In an embodiment, the method may further include terminating the operation of further increasing when: a difference between an estimated rank and a current rank for the transmission is smaller than a predetermined threshold, a difference between an estimated Signal to Interference plus Noise Ratio (SINR) and a currently measured SINR is smaller than a predetermined threshold, a data rate required for data traffic to or from the terminal device is reached, and/or the operation of further increasing has continued for a predetermined time length.

In an embodiment, the operation of adjusting may be triggered when the first rank is lower than a rank threshold and an MCS for the transmission is higher than an MCS threshold.

In an embodiment, the first rank may be obtained by rank estimation based on an estimated SINR associated with the transmission and the operation of adjusting may be triggered further in response to a measured SINR associated with the transmission being higher than the estimated SINR.

In an embodiment, the predetermined step may be dependent on a difference between the measured SINR and the estimated SINR.

In an embodiment, the operation of adjusting may include: decreasing the rank for the transmission from a first rank to a second rank, the second rank being obtained by decreasing the first rank by a predetermined step or selected from a set of rank candidates.

In an embodiment, the operation of selecting the rank to be used for the transmission may include: selecting the second rank as the rank to be used for the transmission when the transmission using the second rank has been successfully received.

In an embodiment, the method may further include, when the transmission using the second rank has not been successfully received: further decreasing the rank for the transmission, until the transmission using a third rank has been successfully received. The operation of selecting the rank to be used for the transmission may include: selecting the third rank as the rank to be used for the transmission.

In an embodiment, the operation of adjusting may be triggered when the first rank is higher than a rank threshold and an MCS for the transmission is lower than an MCS threshold.

In an embodiment, the first rank may be obtained by rank estimation based on an estimated SINR associated with the transmission and the operation of adjusting may be triggered further in response to a measured SINR associated with the transmission being lower than the estimated SINR.

In an embodiment, the predetermined step may be dependent on a difference between the measured SINR and the estimated SINR.

In an embodiment, the operation of adjusting may be performed in response to data traffic to or from the terminal device requiring a data rate higher than a predetermined data rate for a time period longer than a predetermined time period.

In an embodiment, the method may further include, when the transmission is a downlink transmission to the terminal device: receiving from the terminal device a Hybrid Automatic Repeat reQuest (HARQ) feedback indicating whether the downlink transmission using the adjusted rank has been successfully received by the terminal device.

According to a second aspect of the present disclosure, a network device is provided. The network device includes a transceiver, a processor and a memory. The memory contains instructions executable by the processor whereby the network device is operative to perform the method according to the above first aspect.

According to a third aspect of the present disclosure, a computer readable storage medium is provided. The computer readable storage medium has computer program instructions stored thereon. The computer program instructions, when executed by a processor in a network device, cause the network device to perform the method according to the above first aspect.

With the embodiments of the present disclosure, a network device can adjust a rank for a transmission to or from a terminal device, and select a rank to be used for the transmission based on whether the transmission using the adjusted rank has been successfully received. In this way, an optimal rank can be selected for the transmission in an efficient manner.

BRIEF DESCRIPTION OF THE DRAWINGS

The above and other objects, features and advantages will be more apparent from the following description of embodiments with reference to the figures, in which.

DETAILED DESCRIPTION

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network node" or "network device" refers to a device in a wireless communication network via which a terminal device accesses the network and receives services therefrom. The network node or network device refers to a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink transmission refers to a transmission from a network device to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 1:
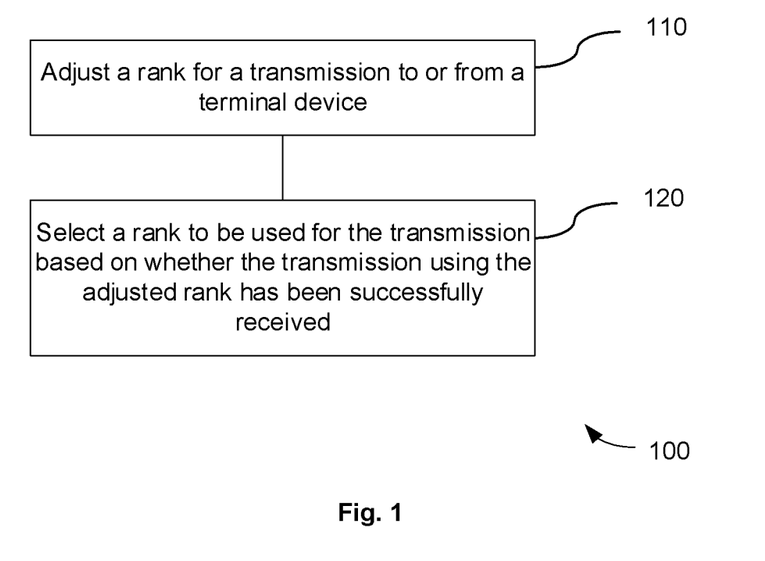
FIG. 1 is a flowchart illustrating a method for rank selection according to an embodiment of the present disclosure.

FIG. 1 is a flowchart illustrating a method 100 for rank selection according to an embodiment of the present disclosure. The method 100 can be performed at a network device, e.g., a gNB.

At block 110, a rank for a transmission to or from a terminal device is adjusted. That is, the transmission can be an uplink or downlink transmission. Accordingly, the rank can be an uplink rank or a downlink rank.

At block 120, a rank to be used for the transmission is selected based on whether the transmission using the adjusted rank has been successfully received.

For example, in the block 120, when the transmission is an uplink transmission from the terminal device, the network device can determine whether the transmission using the adjusted rank has been successfully received on its own. When the transmission is a downlink transmission to the terminal device, the network device can receive from the terminal device a HARQ feedback indicating whether the downlink transmission using the adjusted rank has been successfully received by the terminal device. That is, the HARQ feedback can be an Acknowledgement (ACK) indicating that the downlink transmission has been successfully received by the terminal device, or a Negative Acknowledgement (NACK) indicating that the downlink transmission has not been successfully received by the terminal device.

In an example, an MCS for the transmission can be adjusted in association with the adjusting of the rank in the block 110, such that a Transport Block Size (TBS) or a ratio of the TBS to a number of sub-carriers used for the transmission remains unchanged after the adjusting of the rank. In order to ensure a fair comparison between the rank before the adjusting and the rank after the adjusting, the same TBS and the same number of Physical Resource Blocks (PRBs) or sub-carriers can be used before and after the adjusting. When more (or less) PRBs or sub-carriers are used, the TBS can be increased (or decreased) proportionally for fair comparison.

In an example, in the block 110, the rank for the transmission can be increased from a first rank (denoted as R1) to a second rank (denoted as R2, R2>R1). Here, R2 can be obtained by increasing R1 by a predetermined step $\Delta r$, i.e., R2=R1+$\Delta r$. Alternatively, R2 can be selected from a set of rank candidates. When the transmission using R2 has been successfully received, in the block 120, R2 can be selected as the rank to be used for the transmission. In this case, optionally, the rank for the transmission can be further increased, until the transmission using a third rank has not been successfully received, and a rank used immediately before the third rank can be selected as the rank to be used for the transmission. For example, the rank for the transmission can be further increased to R3 (R3>R2), then to R4 (R4>R3) and finally to R5 (R5>R4), until the transmission using R5 has not been successfully received, and in this case R4 can be selected as the rank to be used for the transmission. As an alternative, the operation of further increasing can be terminated when a difference between an estimated rank (e.g., based on channel measurements) and a current rank for the transmission is smaller than a predetermined threshold, when a difference between an estimated SINR (e.g., based on channel measurements and estimated interferences, including an estimated inter-layer interference) and a currently measured SINR is smaller than a predetermined threshold, when a data rate required for data traffic to or from the terminal device is reached, and/or the operation of further increasing has continued for a predetermined time length. On the other hand, when the transmission using R2 has not been successfully received, in the block 120, R1 can be selected as the rank to be used for the transmission.

In an example, the increasing of the rank, e.g., from R1 to R2, can be triggered when R1 is lower than a rank threshold and an MCS for the transmission is higher than an MCS threshold. Here, R1 can be obtained by rank estimation based on an estimated SINR associated with the transmission. However, the MCS is determined by a measured SINR, which is an actual SINR and is dependent on e.g., a distance between the network device and the terminal device and an inter-layer interference. When the MCS is relatively high while the rank is relatively low, it may suggest that R1 might be too low as a result of e.g., an underestimated SINR (due to e.g., an overestimated inter-layer interference) and thus may be increased. Accordingly, the increasing of the rank can be triggered further in response to a measured SINR associated with the transmission being higher than the estimated SINR.

In an example, the above predetermined step, $\Delta r$, can be dependent on a difference between the measured SINR and the estimated SINR. For example, for a larger difference between the measured SINR and the estimated SINR, $\Delta r$, can be set to larger for facilitating convergence of the rank.

On the other hand, in the block 110, the rank for the transmission can be decreased from a first rank (denoted as R1) to a second rank (denoted as R2', R2'<R1). Here, R2' can be obtained by decreasing R1 by a predetermined step $\Delta r'$, i.e., R2'=R1−$\Delta r'$. Alternatively, R2 can be selected from a set of rank candidates. When the transmission using the R2' has been successfully received, in the block 120, R2' can be selected as the rank to be used for the transmission. When the transmission using R2' has not been successfully received, the rank for the transmission can be further reduced, until the transmission using a third rank has been successfully received, and the third rank can be selected as the rank to be used for the transmission. For example, the rank for the transmission can be further decreased to R3' (R3'<R2') and then to R4' (R4'<R3'), until the transmission using R4' has been successfully received, and in this case R4' can be selected as the rank to be used for the transmission.

In an example, the decreasing of the rank, e.g., from R1 to R2', can be triggered when R1 is higher than a rank threshold and an MCS for the transmission is lower than an MCS threshold. Here, R1 can be obtained by rank estimation based on an estimated SINR associated with the transmission. When the MCS is relatively low while the rank is relatively high, it may suggest that R1 might be too high as a result of e.g., an overestimated SINR (due to e.g., an underestimated inter-layer interference) and thus may be decreased. Accordingly, the decreasing of the rank can be triggered further in response to a measured SINR associated with the transmission being lower than the estimated SINR.

In an example, the above predetermined step, Δr', can be dependent on a difference between the measured SINR and the estimated SINR. For example, for a larger difference between the measured SINR and the estimated SINR, Δr', can be set to larger for facilitating convergence of the rank.

In an example, the adjusting in the block 110 can be performed in response to data traffic to or from the terminal device requiring a data rate higher than a predetermined data rate for a time period longer than a predetermined time period. Optionally, the adjusting can be terminated when the adjusting has continued for a predetermined time length but fails to converge, e.g., due to channel variation. When the adjusting has not be triggered or has been terminated, the rank can be determined by rank estimation, i.e., based on channel measurements.

Figure 2:
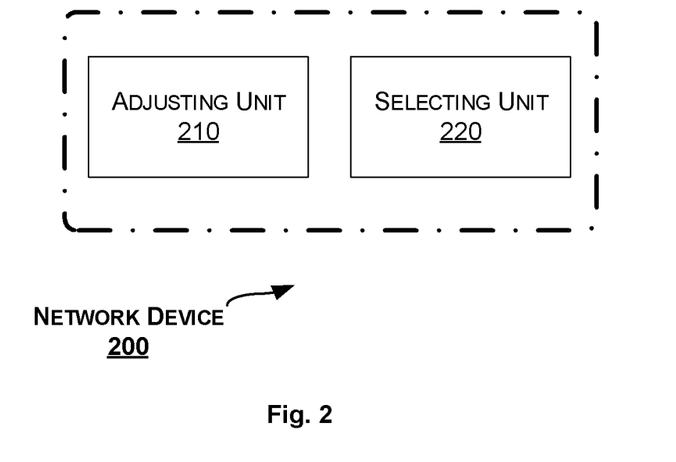
FIG. 2 is a block diagram of a network device according to an embodiment of the present disclosure.

Correspondingly to the method 100 as described above, a network device is provided. FIG. 2 is a block diagram of a network device 200 according to an embodiment of the present disclosure.

As shown in FIG. 2, the network device 200 includes an adjusting unit 210 configured to adjust a rank for a transmission to or from a terminal device. The network device 200 further includes a selecting unit 220 configured to select a rank to be used for the transmission based on whether the transmission using the adjusted rank has been successfully received.

In an embodiment, the adjusting unit 210 can be further configured to adjust an MCS for the transmission in association with the adjusting of the rank, such that a TBS or a ratio of the TBS to a number of sub-carriers used for the transmission remains unchanged after the adjusting of the rank.

In an embodiment, the adjusting unit 210 can be configured to increase the rank for the transmission from a first rank to a second rank, the second rank being obtained by increasing the first rank by a predetermined step or selected from a set of rank candidates.

In an embodiment, the selecting unit 220 can be configured to select the second rank as the rank to be used for the transmission when the transmission using the second rank has been successfully received, or select the first rank as the rank to be used for the transmission when the transmission using the second rank has not been successfully received.

In an embodiment, the adjusting unit 210 can be further configured to, subsequent to selecting the second rank as the rank to be used for the transmission: further increase the rank for the transmission, until the transmission using a third rank has not been successfully received. The selecting unit 220 can be further configured to select a rank used immediately before the third rank as the rank to be used for the transmission.

In an embodiment, the adjusting unit 210 can be further configured to terminate the operation of further increasing when: a difference between an estimated rank and a current rank for the transmission is smaller than a predetermined threshold, a difference between an estimated Signal to Interference plus Noise Ratio (SINR) and a currently measured SINR is smaller than a predetermined threshold, a data rate required for data traffic to or from the terminal device is reached, and/or the operation of further increasing has continued for a predetermined time length.

In an embodiment, the operation of adjusting may be triggered when the first rank is lower than a rank threshold and an MCS for the transmission is higher than an MCS threshold.

In an embodiment, the first rank may be obtained by rank estimation based on an estimated SINR associated with the transmission and the operation of adjusting may be triggered further in response to a measured SINR associated with the transmission being higher than the estimated SINR.

In an embodiment, the predetermined step may be dependent on a difference between the measured SINR and the estimated SINR.

In an embodiment, the adjusting unit 210 can be configured to decrease the rank for the transmission from a first rank to a second rank, the second rank being obtained by decreasing the first rank by a predetermined step or selected from a set of rank candidates.

In an embodiment, the selecting unit 220 can be configured to: select the second rank as the rank to be used for the transmission when the transmission using the second rank has been successfully received.

In an embodiment, the adjusting unit 210 can be further configured to, when the transmission using the second rank has not been successfully received: further decrease the rank for the transmission, until the transmission using a third rank has been successfully received. The selecting unit 220 can be configured to select the third rank as the rank to be used for the transmission.

In an embodiment, the operation of adjusting may be triggered when the first rank is higher than a rank threshold and an MCS for the transmission is lower than an MCS threshold.

In an embodiment, the first rank may be obtained by rank estimation based on an estimated SINR associated with the transmission and the operation of adjusting may be triggered further in response to a measured SINR associated with the transmission being lower than the estimated SINR.

In an embodiment, the predetermined step may be dependent on a difference between the measured SINR and the estimated SINR.

In an embodiment, the operation of adjusting may be performed in response to data traffic to or from the terminal device requiring a data rate higher than a predetermined data rate for a time period longer than a predetermined time period.

In an embodiment, the network device 200 can further include a receiving unit configured to, when the transmission is a downlink transmission to the terminal device: receive from the terminal device a HARQ feedback indicating whether the downlink transmission using the adjusted rank has been successfully received by the terminal device.

The adjusting unit 210 and the selecting unit 220 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 1.

Figure 3:
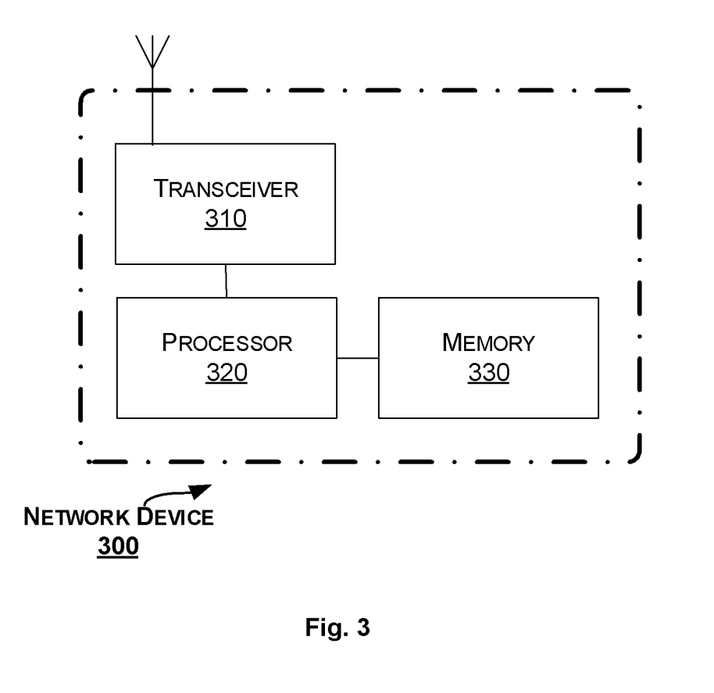
FIG. 3 is a block diagram of a network device according to another embodiment of the present disclosure.

FIG. 3 is a block diagram of a network device 300 according to another embodiment of the present disclosure.

The network device 300 includes a transceiver 310, a processor 320 and a memory 330. The memory 330 contains instructions executable by the processor 320 whereby the network device 300 is operative to perform the actions, e.g., of the procedure described earlier in conjunction with FIG. 1. Particularly, the memory 330 contains instructions executable by the processor 320 whereby the network device 300 is operative to: adjust a rank for a transmission to or from a terminal device; and select a rank to be used for the transmission based on whether the transmission using the adjusted rank has been successfully received.

In an embodiment, the memory 330 may further contain instructions executable by the processor 320 whereby the network device 300 is operative to: adjust an MCS for the transmission in association with the adjusting of the rank, such that a TBS or a ratio of the TBS to a number of sub-carriers used for the transmission remains unchanged after the adjusting of the rank.

In an embodiment, the operation of adjusting may include: increasing the rank for the transmission from a first rank to a second rank, the second rank being obtained by increasing the first rank by a predetermined step or selected from a set of rank candidates.

In an embodiment, the operation of selecting the rank to be used for the transmission may include: selecting the second rank as the rank to be used for the transmission when the transmission using the second rank has been successfully received, or selecting the first rank as the rank to be used for the transmission when the transmission using the second rank has not been successfully received.

In an embodiment, the memory 330 may further contain instructions executable by the processor 320 whereby the network device 300 is operative to, subsequent to selecting the second rank as the rank to be used for the transmission: further increase the rank for the transmission, until the transmission using a third rank has not been successfully received; and select a rank used immediately before the third rank as the rank to be used for the transmission.

In an embodiment, the memory 330 may further contain instructions executable by the processor 320 whereby the network device 300 is operative to: terminate the operation of further increasing when: a difference between an estimated rank and a current rank for the transmission is smaller than a predetermined threshold, a difference between an estimated Signal to Interference plus Noise Ratio (SINR) and a currently measured SINR is smaller than a predetermined threshold, a data rate required for data traffic to or from the terminal device is reached, and/or the operation of further increasing has continued for a predetermined time length.

In an embodiment, the operation of adjusting may be triggered when the first rank is lower than a rank threshold and an MCS for the transmission is higher than an MCS threshold.

In an embodiment, the first rank may be obtained by rank estimation based on an estimated SINR associated with the transmission and the operation of adjusting may be triggered further in response to a measured SINR associated with the transmission being higher than the estimated SINR.

In an embodiment, the predetermined step may be dependent on a difference between the measured SINR and the estimated SINR.

In an embodiment, the operation of adjusting may include: decreasing the rank for the transmission from a first rank to a second rank, the second rank being obtained by decreasing the first rank by a predetermined step or selected from a set of rank candidates.

In an embodiment, the operation of selecting the rank to be used for the transmission may include: selecting the second rank as the rank to be used for the transmission when the transmission using the second rank has been successfully received.

In an embodiment, the memory 330 may further contain instructions executable by the processor 320 whereby the network device 300 is operative to, when the transmission using the second rank has not been successfully received: further decrease the rank for the transmission, until the transmission using a third rank has been successfully received. The operation of selecting the rank to be used for the transmission may include: selecting the third rank as the rank to be used for the transmission.

In an embodiment, the operation of adjusting may be triggered when the first rank is higher than a rank threshold and an MCS for the transmission is lower than an MCS threshold.

In an embodiment, the first rank may be obtained by rank estimation based on an estimated SINR associated with the transmission and the operation of adjusting may be triggered further in response to a measured SINR associated with the transmission being lower than the estimated SINR.

In an embodiment, the predetermined step may be dependent on a difference between the measured SINR and the estimated SINR.

In an embodiment, the operation of adjusting may be performed in response to data traffic to or from the terminal device requiring a data rate higher than a predetermined data rate for a time period longer than a predetermined time period.

In an embodiment, the memory 330 may further contain instructions executable by the processor 320 whereby the network device 300 is operative to, when the transmission is a downlink transmission to the terminal device: receive from the terminal device a HARQ feedback indicating whether the downlink transmission using the adjusted rank has been successfully received by the terminal device.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 320 causes the network device 300 to perform the actions, e.g., of the procedure described earlier in conjunction with FIG. 1.

The computer program product may be configured as a computer program code structured in computer program modules. The computer program modules could essentially perform the actions of the flow illustrated in FIG. 1.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

Figure 4:
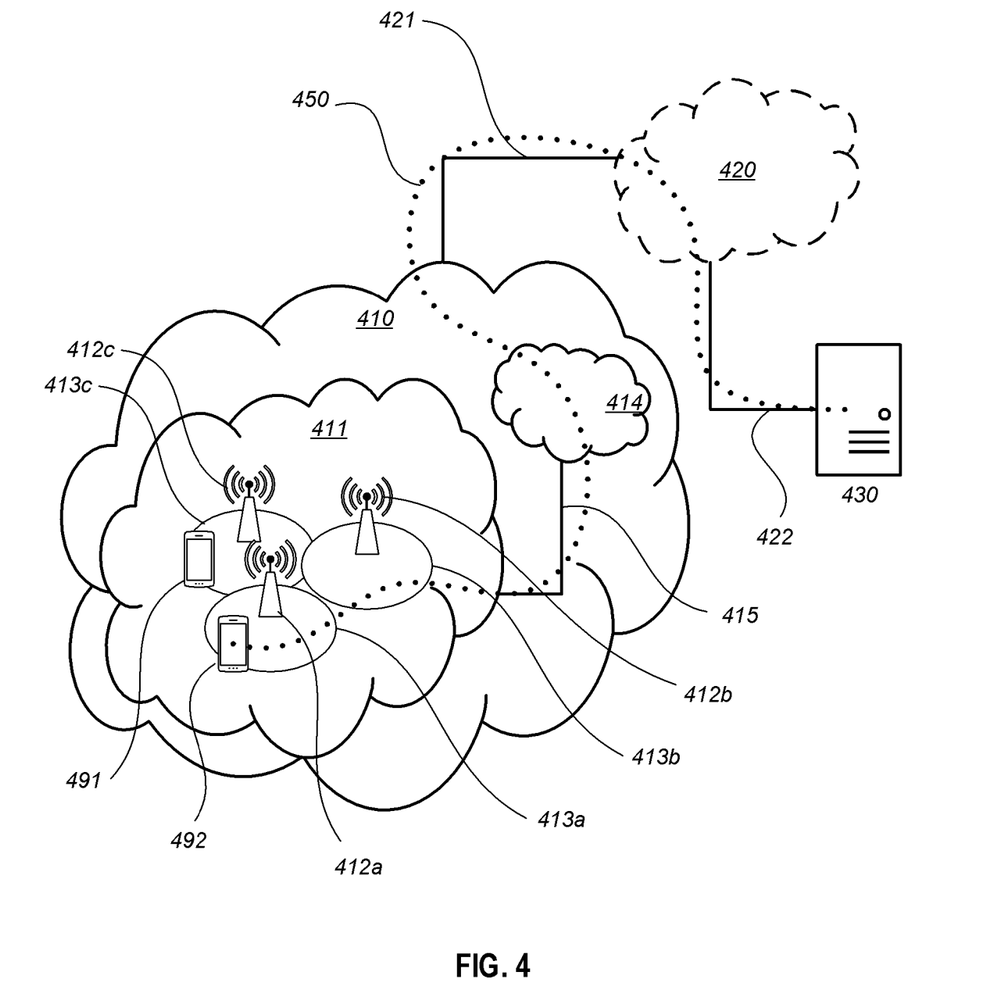
FIG. 4 schematically illustrates a telecommunication network connected via an intermediate network to a host computer.

With reference to FIG. 4, in accordance with an embodiment, a communication system includes a telecommunication network 410, such as a 3GPP-type cellular network, which comprises an access network 411, such as a radio access network, and a core network 414. The access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to the core network 414 over a wired or wireless connection 415. A first user equipment (UE) 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

The telecommunication network 410 is itself connected to a host computer 430, which may be embodied in the hardware and/or software of a standalone server, a cloud-implemented server, a distributed server or as processing resources in a server farm. The host computer 430 may be under the ownership or control of a service provider, or may be operated by the service provider or on behalf of the service provider. The connections 421, 422 between the telecommunication network 410 and the host computer 430 may extend directly from the core network 414 to the host computer 430 or may go via an optional intermediate network 420. The intermediate network 420 may be one of, or a combination of more than one of, a public, private or hosted network; the intermediate network 420, if any, may be a backbone network or the Internet; in particular, the intermediate network 420 may comprise two or more sub-networks (not shown).

The communication system of FIG. 4 as a whole enables connectivity between one of the connected UEs 491, 492 and the host computer 430. The connectivity may be described as an over-the-top (OTT) connection 450. The host computer 430 and the connected UEs 491, 492 are configured to communicate data and/or signaling via the OTT connection 450, using the access network 411, the core network 414, any intermediate network 420 and possible further infrastructure (not shown) as intermediaries. The OTT connection 450 may be transparent in the sense that the participating communication devices through which the OTT connection 450 passes are unaware of routing of uplink and downlink communications. For example, a base station 412 may not or need not be informed about the past routing of an incoming downlink communication with data originating from a host computer 430 to be forwarded (e.g., handed over) to a connected UE 491. Similarly, the base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 5. In a communication system 500, a host computer 510 comprises hardware 515 including a communication interface 516 configured to set up and maintain a wired or wireless connection with an interface of a different communication device of the communication system 500. The host computer 510 further comprises processing circuitry 518, which may have storage and/or processing capabilities. In particular, the processing circuitry 518 may comprise one or more programmable processors, application-specific integrated circuits, field programmable gate arrays or combinations of these (not shown) adapted to execute instructions. The host computer 510 further comprises software 511, which is stored in or accessible by the host computer 510 and executable by the processing circuitry 518. The software 511 includes a host application 512. The host application 512 may be operable to provide a service to a remote user, such as a UE 530 connecting via an OTT connection 550 terminating at the UE 530 and the host computer 510. In providing the service to the remote user, the host application 512 may provide user data which is transmitted using the OTT connection 550.

The communication system 500 further includes a base station 520 provided in a telecommunication system and comprising hardware 525 enabling it to communicate with the host computer 510 and with the UE 530. The hardware 525 may include a communication interface 526 for setting up and maintaining a wired or wireless connection with an interface of a different communication device of the communication system 500, as well as a radio interface 527 for setting up and maintaining at least a wireless connection 570 with a UE 530 located in a coverage area (not shown in FIG. 5) served by the base station 520. The communication interface 526 may be configured to facilitate a connection 560 to the host computer 510. The connection 560 may be direct or it may pass through a core network (not shown in FIG. 5) of the telecommunication system and/or through one or more intermediate networks outside the telecommunication system. In the embodiment shown, the hardware 525 of the base station 520 further includes processing circuitry 528, which may comprise one or more programmable processors, application-specific integrated circuits, field programmable gate arrays or combinations of these (not shown) adapted to execute instructions. The base station 520 further has software 521 stored internally or accessible via an external connection.

The communication system 500 further includes the UE 530 already referred to. Its hardware 535 may include a radio interface 537 configured to set up and maintain a wireless connection 570 with a base station serving a coverage area in which the UE 530 is currently located. The hardware 535 of the UE 530 further includes processing circuitry 538, which may comprise one or more programmable processors, application-specific integrated circuits, field programmable gate arrays or combinations of these (not shown) adapted to execute instructions. The UE 530 further comprises software 531, which is stored in or accessible by the UE 530 and executable by the processing circuitry 538. The software 531 includes a client application 532. The client application 532 may be operable to provide a service to a human or non-human user via the UE 530, with the support of the host computer 510. In the host computer 510, an executing host application 512 may communicate with the executing client application 532 via the OTT connection 550 terminating at the UE 530 and the host computer 510. In providing the service to the user, the client application 532 may receive request data from the host application 512 and provide user data in response to the request data. The OTT connection 550 may transfer both the request data and the user data. The client application 532 may interact with the user to generate the user data that it provides.

Figure 5:
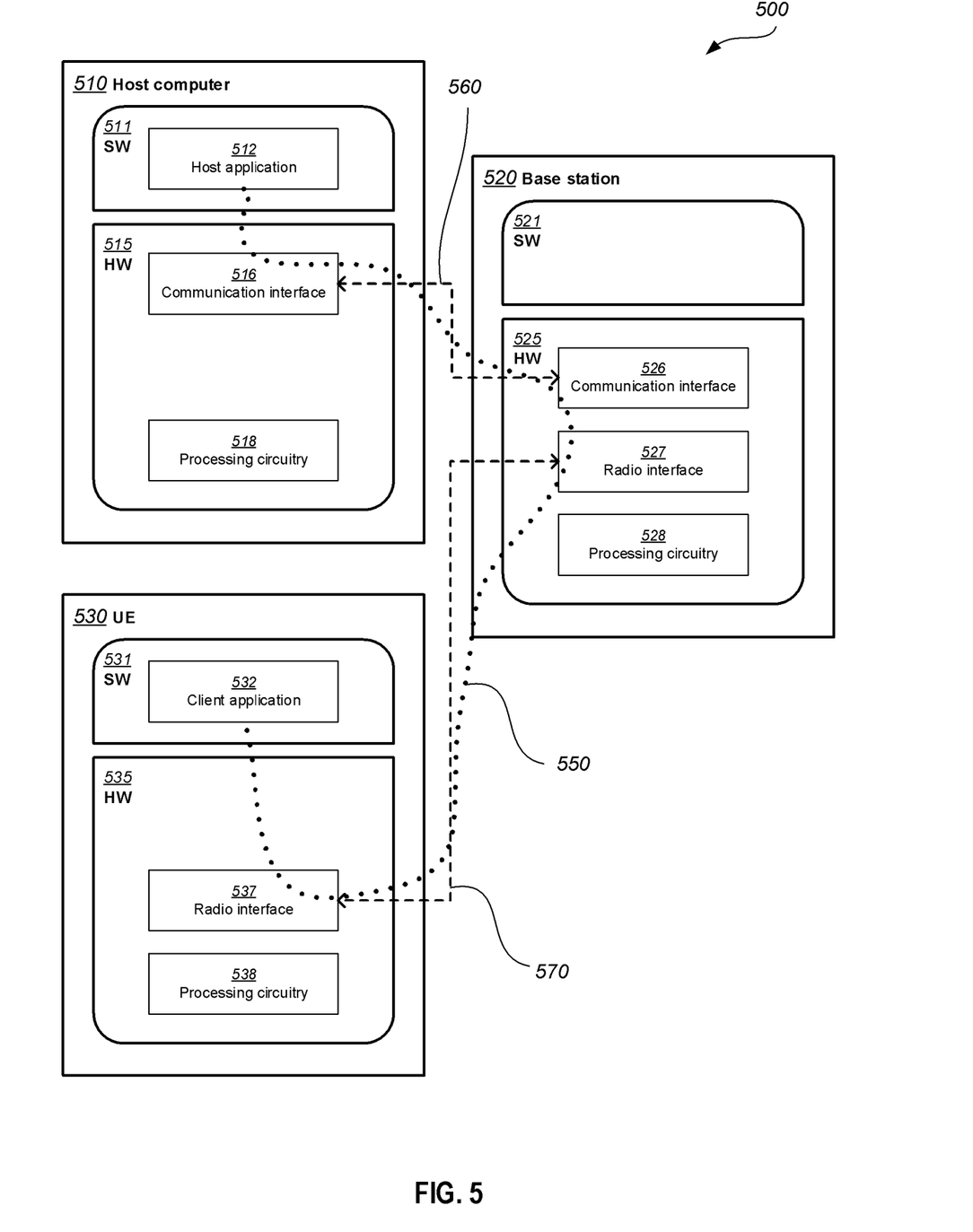
FIG. 5 is a generalized block diagram of a host computer communicating via a base station with a user equipment over a partially wireless connection.

It is noted that the host computer 510, base station 520 and UE 530 illustrated in FIG. 5 may be identical to the host computer 430, one of the base stations 412a, 412b, 412c and one of the UEs 491, 492 of FIG. 4, respectively. This is to say, the inner workings of these entities may be as shown in FIG. 5 and independently, the surrounding network topology may be that of FIG. 4.

In FIG. 5, the OTT connection 550 has been drawn abstractly to illustrate the communication between the host computer 510 and the use equipment 530 via the base station 520, without explicit reference to any intermediary devices and the precise routing of messages via these devices. Network infrastructure may determine the routing, which it may be configured to hide from the UE 530 or from the service provider operating the host computer 510, or both. While the OTT connection 550 is active, the network infrastructure may further take decisions by which it dynamically changes the routing (e.g., on the basis of load balancing consideration or reconfiguration of the network).

The wireless connection 570 between the UE 530 and the base station 520 is in accordance with the teachings of the embodiments described throughout this disclosure. One or more of the various embodiments improve the performance of OTT services provided to the UE 530 using the OTT connection 550, in which the wireless connection 570 forms the last segment. More precisely, the teachings of these embodiments may improve radio resource utilization and thereby provide benefits such as reduced user waiting time at the UE.

A measurement procedure may be provided for the purpose of monitoring data rate, latency and other factors on which the one or more embodiments improve. There may further be an optional network functionality for reconfiguring the OTT connection 550 between the host computer 510 and UE 530, in response to variations in the measurement results. The measurement procedure and/or the network functionality for reconfiguring the OTT connection 550 may be implemented in the software 511 of the host computer 510 or in the software 531 of the UE 530, or both. In embodiments, sensors (not shown) may be deployed in or in association with communication devices through which the OTT connection 550 passes; the sensors may participate in the measurement procedure by supplying values of the monitored quantities exemplified above, or supplying values of other physical quantities from which software 511, 531 may compute or estimate the monitored quantities. The reconfiguring of the OTT connection 550 may include message format, retransmission settings, preferred routing etc.; the reconfiguring need not affect the base station 520, and it may be unknown or imperceptible to the base station 520. Such procedures and functionalities may be known and practiced in the art. In certain embodiments, measurements may involve proprietary UE signaling facilitating the host computer's 510 measurements of throughput, propagation times, latency and the like. The measurements may be implemented in that the software 511, 531 causes messages to be transmitted, in particular empty or 'dummy' messages, using the OTT connection 550 while it monitors propagation times, errors etc.

Figure 6:
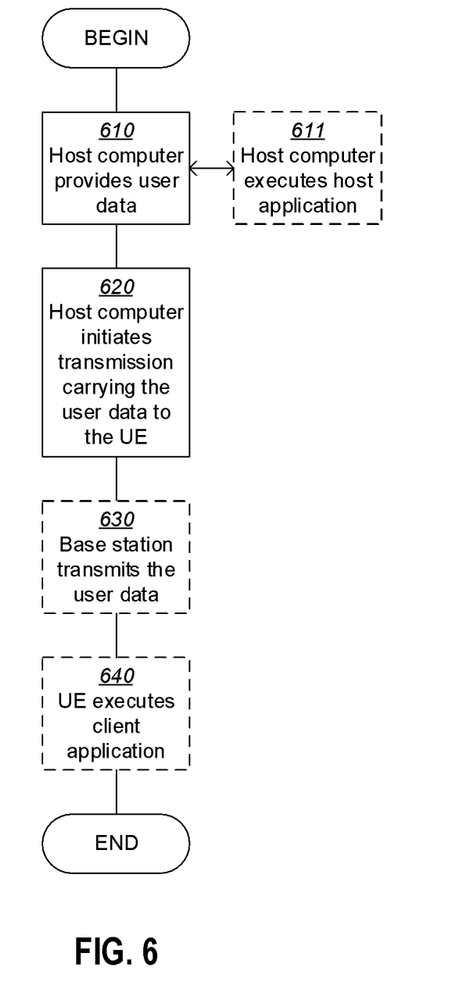
FIGS. 6 to 9 are flowcharts illustrating methods implemented in a communication system including a host computer, a base station and a user equipment.

FIG. 6 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 6 will be included in this section. In a first step 610 of the method, the host computer provides user data. In an optional substep 611 of the first step 610, the host computer provides the user data by executing a host application. In a second step 620, the host computer initiates a transmission carrying the user data to the UE. In an optional third step 630, the base station transmits to the UE the user data which was carried in the transmission that the host computer initiated, in accordance with the teachings of the embodiments described throughout this disclosure. In an optional fourth step 640, the UE executes a client application associated with the host application executed by the host computer.

Figure 7:
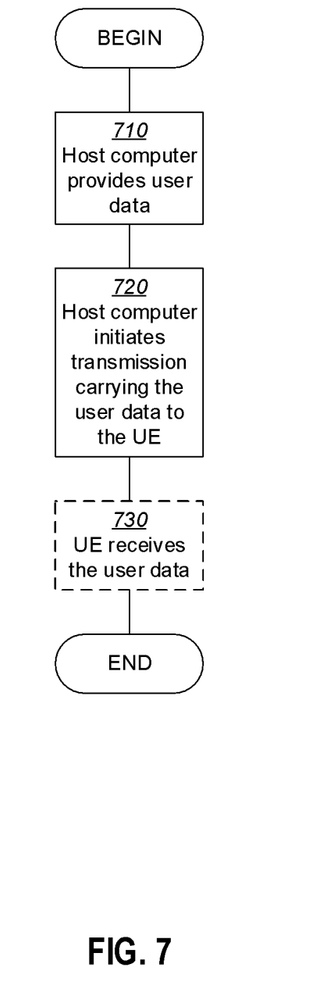

FIG. 7 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 7 will be included in this section. In a first step 710 of the method, the host computer provides user data. In an optional substep (not shown) the host computer provides the user data by executing a host application. In a second step 720, the host computer initiates a transmission carrying the user data to the UE. The transmission may pass via the base station, in accordance with the teachings of the embodiments described throughout this disclosure. In an optional third step 730, the UE receives the user data carried in the transmission.

Figure 8:
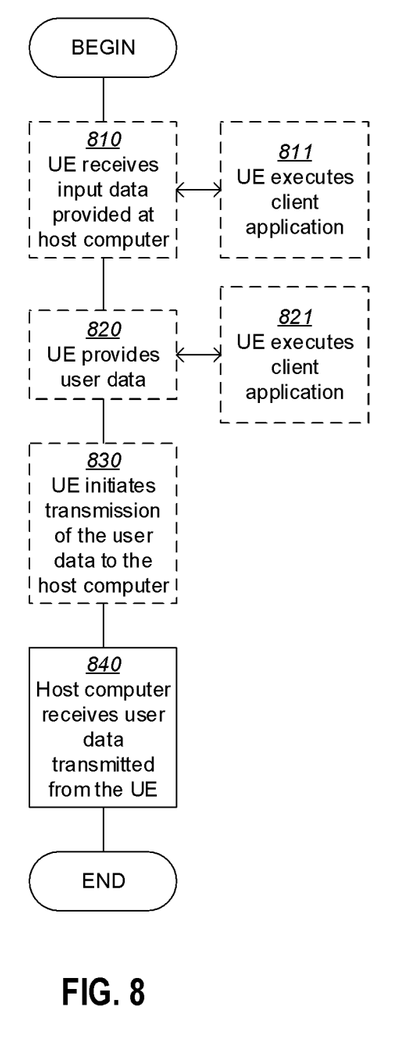

FIG. 8 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 8 will be included in this section. In an optional first step 810 of the method, the UE receives input data provided by the host computer. Additionally or alternatively, in an optional second step 820, the UE provides user data. In an optional substep 821 of the second step 820, the UE provides the user data by executing a client application. In a further optional substep 811 of the first step 810, the UE executes a client application which provides the user data in reaction to the received input data provided by the host computer. In providing the user data, the executed client application may further consider user input received from the user. Regardless of the specific manner in which the user data was provided, the UE initiates, in an optional third substep 830, transmission of the user data to the host computer. In a fourth step 840 of the method, the host computer receives the user data transmitted from the UE, in accordance with the teachings of the embodiments described throughout this disclosure.

Figure 9:
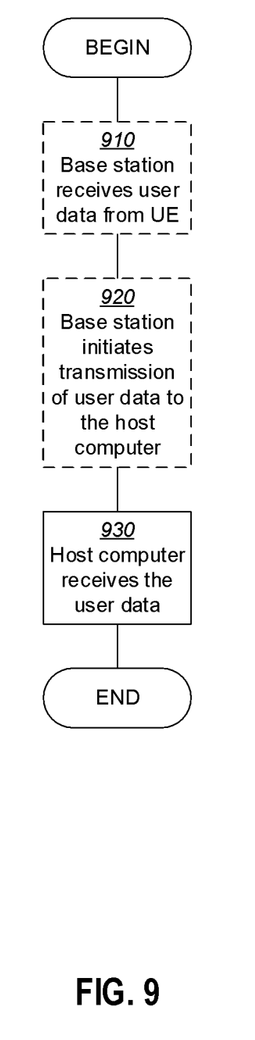

FIG. 9 is a flowchart illustrating a method implemented in a communication system, in accordance with one embodiment. The communication system includes a host computer, a base station and a UE which may be those described with reference to FIGS. 4 and 5. For simplicity of the present disclosure, only drawing references to FIG. 9 will be included in this section. In an optional first step 910 of the method, in accordance with the teachings of the embodiments described throughout this disclosure, the base station receives user data from the UE. In an optional second step

The invention claimed is:

1. A method in a network device for rank selection, wherein rank is the number of transmission layers, the method comprising:
    adjusting a rank for a transmission to or from a terminal device;
    selecting a rank to be used for the transmission based on whether the transmission using the adjusted rank has been successfully received; and
    adjusting a Modulation and Coding Scheme, MCS, for the transmission in association with the adjusting of the rank, to maintain unchanged a Transport Block Size, TBS, or a ratio of the TBS to a number of sub-carriers used for the transmission after the adjusting of the rank.

2. The method of claim 1, wherein said adjusting comprises:
    increasing the rank for the transmission from a first rank to a second rank, the second rank being obtained by increasing the first rank by a predetermined step or selected from a set of rank candidates.

3. The method of claim 2, wherein said selecting the rank to be used for the transmission comprises:
    selecting the second rank as the rank to be used for the transmission when the transmission using the second rank has been successfully received, or
    selecting the first rank as the rank to be used for the transmission when the transmission using the second rank has not been successfully received.

4. The method of claim 3, further comprising, subsequent to selecting the second rank as the rank to be used for the transmission:
    further increasing the rank for the transmission, until the transmission using a third rank has not been successfully received; and
    selecting a rank used immediately before the third rank as the rank to be used for the transmission.

5. The method of claim 4, further comprising:
    terminating said further increasing when:
        a difference between an estimated rank and a current rank for the transmission is smaller than a predetermined threshold,
        a difference between an estimated Signal to Interference plus Noise Ratio, SINR, and a currently measured SINR is smaller than a predetermined threshold,
        a data rate required for data traffic to or from the terminal device is reached, and/or
        said further increasing has continued for a predetermined time length.

6. The method of claim 2, wherein said adjusting is triggered when the first rank is lower than a rank threshold and a Modulation and Coding Scheme, MCS, for the transmission is higher than an MCS threshold.

7. The method of claim 6, wherein the first rank is obtained by rank estimation based on an estimated Signal to Interference plus Noise Ratio, SINR, associated with the transmission and said adjusting is triggered further in response to a measured SINR associated with the transmission being higher than the estimated SINR.

8. The method of claim 7, wherein the predetermined step is dependent on a difference between the measured SINR and the estimated SINR.

9. The method of claim 1, wherein said adjusting comprises:
    decreasing the rank for the transmission from a first rank to a second rank, the second rank being obtained by decreasing the first rank by a predetermined step or selected from a set of rank candidates.

10. The method of claim 9, wherein said selecting the rank to be used for the transmission comprises:
    selecting the second rank as the rank to be used for the transmission when the transmission using the second rank has been successfully received.

11. The method of claim 10, further comprising, when the transmission using the second rank has not been successfully received:
    further decreasing the rank for the transmission, until the transmission using a third rank has been successfully received,
    wherein said selecting the rank to be used for the transmission comprises:
        selecting the third rank as the rank to be used for the transmission.

12. The method of claim 9, wherein said adjusting is triggered when the first rank is higher than a rank threshold and a Modulation and Coding Scheme, MCS, for the transmission is lower than an MCS threshold.

13. The method of claim 12, wherein the first rank is obtained by rank estimation based on an estimated Signal to Interference plus Noise Ratio, SINR, associated with the transmission and said adjusting is triggered further in response to a measured SINR associated with the transmission being lower than the estimated SINR.

14. The method of claim 13, wherein the predetermined step is dependent on a difference between the measured SINR and the estimated SINR.

15. The method of claim 1, wherein said adjusting is performed in response to data traffic to or from the terminal device requiring a data rate higher than a predetermined data rate for a time period longer than a predetermined time period.

16. The method of claim 1, further comprising, when the transmission is a downlink transmission to the terminal device:
    receiving from the terminal device a Hybrid Automatic Repeat reQuest, HARQ, feedback indicating whether the downlink transmission using the adjusted rank has been successfully received by the terminal device.

17. A network device comprising a transceiver, a processor and a memory, the memory comprising instructions executable by the processor whereby the network device is operative to perform the method according to claim 1.

18. A non-transitory computer readable storage medium having computer program instructions stored thereon, the computer program instructions, when executed by a processor in a network device, causing the network device to perform the method according to claim 1.

* * * * *